United States Patent [19]
Zelenák et al.

[11] Patent Number: 5,814,222
[45] Date of Patent: Sep. 29, 1998

[54] OXYGEN ENRICHED LIQUIDS, METHOD AND APPARATUS FOR MAKING, AND APPLICATIONS THEREOF

[75] Inventors: Zoltai Mária náe Zelenák, Budapest; László Berzsenyi, Érd, both of Hungary; Frank Abramoff, Marina del Rey, Calif.

[73] Assignee: Life International Products, Inc., Naples, Fla.

[21] Appl. No.: 411,708

[22] PCT Filed: Mar. 31, 1995

[86] PCT No.: PCT/US95/03889

§ 371 Date: May 1, 1995

§ 102(e) Date: May 1, 1995

[87] PCT Pub. No.: WO95/21930

PCT Pub. Date: Nov. 2, 1995

[51] Int. Cl.$^6$ .................................................... C02F 3/10
[52] U.S. Cl. ..................... 210/615; 210/758; 210/150; 210/205; 210/220; 261/108; 261/113; 261/DIG. 75; 424/722; 426/67; 426/474; 435/299.1; 514/771
[58] Field of Search .................................... 210/615, 620, 210/721, 758, 150, 151, 205, 218, 220, 221.2; 261/109, 110, 113, DIG. 7, DIG. 75; 426/67, 330, 474, 477, 590; 424/722; 514/771; 435/299.1

[56] References Cited

U.S. PATENT DOCUMENTS

| | | | |
|---|---|---|---|
| 835,886 | 11/1906 | Gunn . | |
| 2,326,243 | 8/1943 | Meyer | 261/11 |
| 2,594,474 | 4/1952 | McGrath | 62/89.5 |
| 3,146,195 | 8/1964 | Berardi | 210/169 |
| 3,704,006 | 11/1972 | Grout et al. | 259/4 |
| 3,737,382 | 6/1973 | Fletcher et al. | 210/12 |
| 3,746,323 | 7/1973 | Buffington | 261/122 |
| 3,756,576 | 9/1973 | Tremolada | 261/35 |
| 3,960,164 | 6/1976 | Kelley | 137/202 |
| 4,027,045 | 5/1977 | Fedotkin et al. | 426/312 |
| 4,094,774 | 6/1978 | Smith | 210/12 |
| 4,126,544 | 11/1978 | Baensch et al. | 210/615 |
| 4,347,143 | 8/1982 | Righetti | 210/758 |
| 4,370,304 | 1/1983 | Hendriks | 422/224 |
| 4,674,888 | 6/1987 | Carlson | 366/337 |
| 4,695,378 | 9/1987 | Ackman | 210/198 |
| 4,749,493 | 6/1988 | Hicks | 210/617 |
| 4,749,527 | 6/1988 | Rasmusen | 261/76 |
| 4,793,919 | 12/1988 | McCorquodale | 210/177 |

(List continued on next page.)

FOREIGN PATENT DOCUMENTS

WO 95129130   11/1995   WIPO .

OTHER PUBLICATIONS

*Commercial Oxygen Use in Water–Quality Management*, R.E. Speece et al, "Water Environment & Technology", Jul. 1990.

*Hydrodynamics and Gas–Liquid Mass Transfer in a Downward Venturi–Bubble Column Combination*, C.L. Briens et al, Chemical Engineering Science, vol. 47, No. 13/14, pp. 3549–3556, 1992.

*Primary Examiner*—Peter A. Hruskoci
*Attorney, Agent, or Firm*—Baker & Daniels

[57] ABSTRACT

A process for enriching a liquid with oxygen by introducing the liquid into an oxygen enriching vessel, subdividing the liquid, subjecting the interior of the vessel to an oxygen pressure of at least about 20 psi, conducting the introduced water in a substantially flowing contact with the oxygen, and recovering the water under oxygen pressure when it is to be bottled. The process is carried out in oxygen enriching apparatus having an oxygen enriching vessel, a number of horizontal trays vertically spaced apart from each other and having a central opening, a liquid supply tube ranging into the interior of the enriching vessel through the central openings, means for discharging liquid from the tube onto a tray, an oxygen supply source for providing the oxygen to the vessel, and a liquid outlet for the removal of the oxygenated liquid. The liquids oxygenated by the invention are used in various aerobic and therapeutic processes.

19 Claims, 3 Drawing Sheets

U.S. PATENT DOCUMENTS

| | | | |
|---|---|---|---|
| 4,863,643 | 9/1989 | Cochran | 261/76 |
| 4,874,509 | 10/1989 | Bullock | 210/169 |
| 4,900,480 | 2/1990 | Litz et al. | 261/36.1 |
| 4,956,080 | 9/1990 | Josefik | 210/109 |
| 5,006,352 | 4/1991 | Zoltai et al. | 426/67 |
| 5,013,429 | 5/1991 | Krofta | 210/137 |
| 5,045,202 | 9/1991 | Steams et al. | 210/628 |
| 5,061,377 | 10/1991 | Lee et al. | 210/752 |
| 5,080,802 | 1/1992 | Cairo | 210/703 |
| 5,087,377 | 2/1992 | Josefik | 210/703 |
| 5,092,988 | 3/1992 | Womack | 210/85 |
| 5,152,888 | 10/1992 | Koyama | 210/195.3 |
| 5,167,798 | 12/1992 | Yoon et al. | 209/170 |
| 5,167,806 | 12/1992 | Wang | 210/188 |
| 5,200,080 | 4/1993 | Bergman | 210/607 |
| 5,259,997 | 11/1993 | Kazuma | 261/119.1 |
| 5,294,401 | 3/1994 | Hagiwara | 422/48 |
| 5,302,286 | 4/1994 | Semprini et al. | 210/610 |
| 5,356,600 | 10/1994 | Kiyonaga | 422/234 |
| 5,380,471 | 1/1995 | Ban et al. | 261/122.1 |
| 5,396,934 | 3/1995 | Moench | 141/5 |
| 5,403,522 | 4/1995 | Von Berg | 261/36.1 |
| 5,422,045 | 6/1995 | Notar et al. | 261/140.1 |
| 5,433,084 | 7/1995 | Kaiser et al. | 62/306 |
| 5,437,784 | 8/1995 | Meinecke | 209/170 |
| 5,494,583 | 2/1996 | Dieter | 210/721 |
| 5,525,242 | 6/1996 | Kerecz | 210/758 |

OXYGEN ENRICHED LIQUIDS, METHOD AND APPARATUS FOR MAKING, AND APPLICATIONS THEREOF

FIELD OF THE INVENTION

The present invention relates to oxygen enriched liquids, method and apparatus for making, and to methods for their use.

BACKGROUND OF THE INVENTION

It is known to impregnate at super-atmospheric pressure a still (i.e. substantially gas-free) liquid with a gas from an external source. This type of impregnation is usually employed in the prior art to make the liquid effervescent. As described in U.S. Pat. No. 2,927,028, "such artificial impregnation of a liquid with a gas has hitherto been carried out by bubbling the gas through the liquid, or by spraying the liquid into the gas, or by otherwise violently agitating the liquid in the presence of the gas, so as to increase as much as possible the area of surface contact between the liquid and the gas and hasten the entry of the gas into the liquid, the treatment being continued until the pressure of the gas in the liquid is substantially equalled to the applied pressure. The impregnation of the liquid with gas is usually carried out in large vessels and the impregnated liquid is subsequentially transferred to the bottles or other containers in which it is to be marketed, a counter pressure of gas being maintained in these vessels while they are being filled, in order to prevent so far as possible the escape of gas from the liquid."Such a method has not been found to be successful to produce oxygen enriched liquids to achieve either a high level of dissolved oxygen, or to retain the dissolved oxygen in the liquid for an appreciable length of time.

Our U.S. Pat. No. 5,006,352 did provide a process for overcoming some of these drawbacks of the prior art as it applies to the incorporation of oxygen in water. That patent describes a process for enriching water with oxygen, wherein the liquid is saturated with oxygen at a temperature between 0° C. and 5° C. under pressure, and then bottling and sealing the bottle containing the enriched water. The presence of oxygen does not affect the taste of the water and its consumption has a favorable effect on well being and physical performance. A drawback of this process is that it requires the use of low temperatures, achieves a still relatively low level of dissolution of oxygen in the water, and results in a relatively fast loss of the oxygen enrichment when the enriched water is exposed to ambient pressure.

U.S. Pat. No. 4,027,045 discloses another process for preparing an oxygenated cocktail. None of the known oxygenation processes have proved successful for a producing sufficiently high oxygen loading of the liquid.

Suggestions were made in the prior art for increasing oxygen available for various aerobic and therapeutic processes by the use of oxygen enriched water and other liquids. However, the lack of ways to obtain a sufficiently high degree of oxygen enrichment of water did not enable any effective follow-up on such suggestions.

DESCRIPTION OF THE INVENTION

It is an object of the present invention to enable the production of oxygen enriched water at from cooled up to ambient temperatures with higher concentration of dissolved oxygen than has been possible in the prior art, and to provide for the improved utilization of such highly oxygenated water.

Another object of the present invention is to provide improved aerobic and therapeutic processes employing water highly enriched with oxygen in accordance with the present invention.

Yet another object of the present invention is to contribute characteristics to highly oxygen enriched water, which make it attractive as a beverage.

The present invention provides a process for enriching water with oxygen, which comprises introducing water into a sealed enriching vessel, subdividing the water in the vessel, subjecting the interior of the vessel to an oxygen pressure of at least about 20 pounds per square inch (psi), suitably between about 35 and about 50 psi, conducting the subdivided water in a substantially flowing contact with the oxygen, and recovering the water under oxygen pressure. The process of the present invention enables the dissolution as much as 50 mg/l or more oxygen in water.

As used throughout the specification and the claims, "water" refers to any still, or effervescent liquid intended to be enriched with oxygen. Any reference throughout the specification and the claims to "subdividing" water introduced into the oxygen enriching vessel, means the breaking up flowing water into discrete parts and spreading out flowing water over contact areas within the vessel. In the process of the present invention the water is suitably subdivided at least in part or its entirety by the oxygen employed in the process.

The oxygen enrichment of water does not impart any taste to the resulting liquid and the added oxygen also tends to reduce the tartness of any carbonation.

The present invention also involves apparatus for enriching water with oxygen, the apparatus having an oxygen enrichment vessel, a plurality of horizontal trays within the vessel in a vertically spaced apart relationship, each of the trays having a substantially central opening and outer rim spaced from the interior surface of the vessel, a liquid supply tube ranging into the interior of the vessel through the central opening, a liquid discharge device in the supply tube for discharging liquid onto a tray, an oxygen supply source for introduction of oxygen into the interior of the vessel at a pressure of a least about 20 psi, and an outlet for the removal the oxygenated liquid from the vessel.

The present invention also involves liquids enriched with oxygen in accordance with the present invention and processes for using oxygen enriched liquids prepared in accordance with the preparatory process of the present invention and prepared by the use of the apparatus of the invention. These processes of use involve both aerobic processes and other processes such as therapeutic processes advantageously employing oxygen containing liquids. As used throughout the specification and the claims, reference to an "aerobic" process generally includes all chemical and microbiological processes in which a chemical or microbiological process is carried out or is promoted in a liquid medium in the presence of oxygen. As used throughout the specification and the claims "therapeutic" processes involve the oxygenation of the body or its parts by treatment with an agent in a liquid vehicle containing dissolved oxygen.

Suitably aerobic processes in which water oxygenated in accordance with the present invention can be employed include for example processes in which heretofore water has been aerated such as by bubbling air thereinto, and also in situ or ex situ bioremediation of contaminated (e.g. with petroleum products) surface and ground waters; wastewater, sludge, and animal waste treatment, both by fixed film and by suspended growth methods; rehabilitation of atrophying lakes; biochemical oxygen demand (BOD) measurement techniques; fresh water aquaculture (e.g. fish farming); odor suppression barriers for anaerobic processes; and insolubilization of dissolved contaminants (e.g. Fe. Mn ions) for removal by filtration or sedimentation.

In view of the particularly good oxygen retention of liquids oxygenated by the present invention kept in containers, a particularly advantageous new aerobic use of those liquids was discovered. In accordance with a further feature of the present invention such oxygenated liquids can be advantageously employed as the fermentation liquor of all kinds of fermentation processes.

Microorganisms such a bacteria consume massive quantities of oxygen in the process of a assimilating or breaking down waste. The rate at which oxygen can be introduced into the biomass, is a substantial limiting factor on how quickly a breakdown by oxygenation can be achieved. The problem with the known process technologies is that oxygen introduction by aeration is highly inefficient because air contains only 21% percent oxygen and thus 79% percent of the energy used by aerators is wasted in pumping useless nitrogen. Therefore, the use of highly oxygenated water in accordance with the present invention in such aerobic processes is expected to be about 5 times more efficient to obtain a like extent of energy efficiency improvement. Thus the infusion of water with 40–50 mg/l of oxygen allowed a more efficient and more rapid aerobic treatment, compared to 7–9 mg/l for the normal oxygen content of water, and just slightly more when a conventional bubbling aerator is used with 20% oxygen containing air.

Suitable therapeutic processes in which liquids made in accordance with the present invention can be advantageously employed include, for example increasing the oxygen content of blood and tissues; oxygenation of wounds to increase the rate of healing and to reduce infections; oxygenated organ transplant storage media; tumor oxygenation for radiation therapy and chemotherapy; lung bypass by oxygenated liquids in case of pulmonary deficiencies; carbon monoxide poisoning; mouthwashes, dentrifices; topical, including cosmetic, treatment media; contact lens treating solutions; and cell level therapeutic applications.

Eight test subjects of various ages and of differing sex, had their blood oxygen contents and their pulse rates determined. Each subject drank between ½ and ¾ liters of water of the present invention prepared in accordance with the present invention. Evidence of a pulmonary function bypass was observed after a short period incubation by an average blood oxygen increase of about 30%, and the effect of a concomitant cardiac relief was observed by an average of about 10% pulse rate reduction.

In view of the particularly good oxygen retention of liquids oxygenated by the present invention kept in containers, a particularly advantageous new therapeutic product of those liquids was discovered. In accordance with a further feature of the present invention such oxygenated liquids can be employed as solvents for physiological saline isotonic solutions.

If desired, the water treated in accordance with the present invention can also be made effervescent by the addition of a gas such as carbon dioxide. If the carbon dioxide is added after the dissolution of the oxygen in the water, then it will displace a portion of the dissolved oxygen. It has been found, however, that the effervescent liquid can be further enriched with oxygen to a substantial degree after the addition of the carbon dioxide. Even more oxygen can be dissolved in the water, if the water being enriched with the oxygen is chilled at the time of the oxygen enrichment. However, some of the chilling or the entire lack of chilling can be substituted by the employment of higher oxygen pressures such as around 50 psi or higher.

Suitably the oxygen is mixed with the water outside of the enrichment vessel, such as in a venturi injector. This leads to a substantial subdivision of the water and an intimate mixing with the injected oxygen even prior to the more complete dissolution of the oxygen in the water within the enrichment vessel.

According to a special application of the process of the invention when a non-alcoholic beverage is produced, the beverage concentrate is diluted to a maximum solid contents of 50% by weight, and the diluted concentrate is then enriched with oxygen. Subsequentially the oxygenated pre-diluted concentrate is further diluted to the desired final solids concentration and is again enriched with oxygen by the process of the present invention, before bottling the oxygen enriched flavored beverage.

DESCRIPTION OF THE DRAWING

The invention is further described with reference being had to the accompanying drawing, wherein.

DETAILED DESCRIPTION

Figure 1:
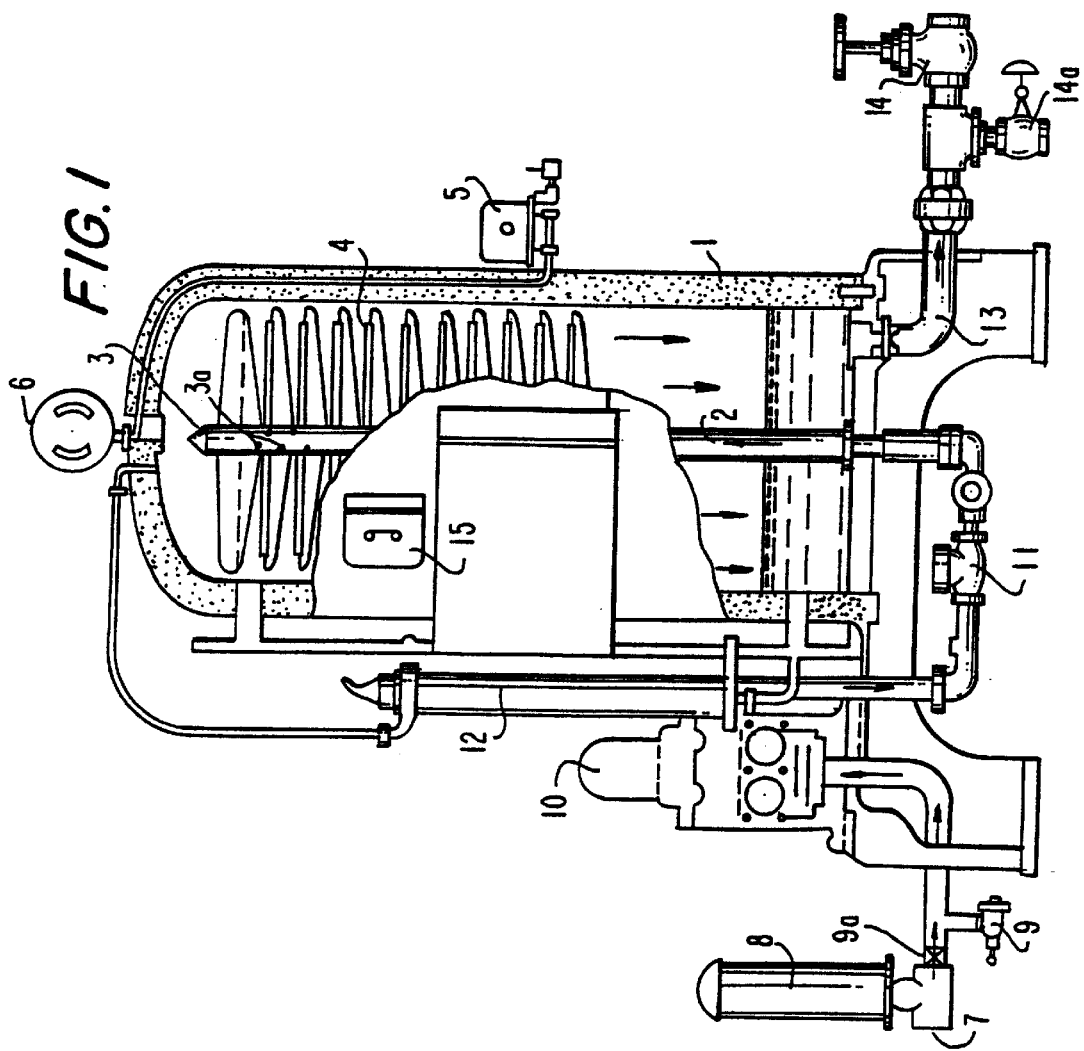
FIG. 1 is a longitudinal cross-sectional view of the apparatus of the present invention, being in part in elevation.
Figure 6:
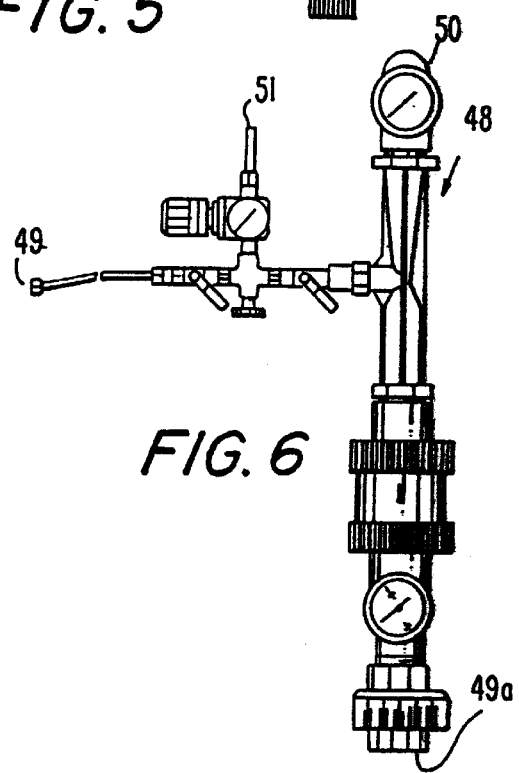
FIG. 6 is an elevational view of a mixing venturi.

In the apparatus shown in FIG. 1, an enriching vessel 1 has an enclosed interior chamber containing a water and oxygen supply tube 2 arranged vertically along the central axis of the vessel. A spray head 3 at the upper end of the tube sprays the water/oxygen mixture in the form of a fine subdivided spray into the upper part of the vessel 1. Annular trays 4 are concentrically arranged around the supply tube 2 through several levels one above the another. The liquid can suitably run down in various ways through or around the plates to be collected at the bottom of the vessel 1. An overpressure relief valve 5 is provided to relieve the interior of the vessel 1 from any undesired overpressure, and a pressure gauge 6 provides a readout of the pressure prevailing within the vessel 1. Water is supplied through an inlet 7 and an air chamber 8 is provided to remove any entrapped gases from the introduced liquid. An oxygen inlet 9 with pressure reducing valve is joined to the water inlet line, suitably through a venturi mixer such as is shown in FIG. 6, suitably a Mazzei venturi. A check valve 9a is inserted in the water line before the oxygen inlet to avoid any back pressure from escaping through the water inlet 7.

A water pump 10 in the liquid supply line has its outlet connected through a safety valve 11 to the water supply tube 2, and an electronic liquid level control unit 12 for maintaining a constant liquid level within the enriching vessel 1. Suitably the water pump 10 can be located before the oxygen input (not shown) to avoid the possibility of a vapor lock in some installations.

The oxygen enriched water can be removed through a water outlet 13 at the bottom of the vessel 1, either through an enriched water outlet valve 14, or through a valve 14a which suitably leads to a collecting tank for the oxygen enriched water.

A switch 15 is provided on the exterior of the enriching vessel 1 for deactivating the liquid pump 10 and the electronic liquid level control unit 12.

The liquid introduced into the enriching vessel through the supply tube 2 can be water or other liquid to be enriched with oxygen including water mixed with a beverage concentrate.

Suitably small openings 3a are provided in the water supply tube 2 above each tray 4 for discharging liquid onto the trays. If the trays themselves do not have perforations, then they may be provided with rims (not shown) to collect some liquid before overflowing the rim to a lower tray or to the bottom of the enriching vessel. If the trays are not perforated, the liquid exiting through the openings 3a will form a boundary surface on the tray between the oxygen and the liquid 4 for maximum incorporation of oxygen into the liquid. In a suitable embodiment of the apparatus of the present invention the topmost tray 4 can be the smallest one, and as water cascades downwardly from it, it can fall on lower trays which are each larger than a tray above.

The subdivided water exiting through the spray head 3 is also exposed to the oxygen atmosphere within the enriching vessel.

A flow meter can be provided in conjunction with the oxygen inlet 9 to permit monitoring of the oxygen flow. The apparatus is adapted to prepare enrich oxygen-enriched liquids in a continuous operation. This can be monitored by the continuous inflow of the oxygen and the liquid.

Most suitably the oxygen can be continuously generated through a molecular sieve type separator which recovers essentially pure oxygen from air by using a porous ceramic material. A suitable oxygen generator of this type is manufactured by Airsep Corp. The concentration of the oxygen dissolved in the water can be suitably measured by the Clark-type polarographic electrode apparatus such as made by Orion Research Incorporated.

A particularly preferred oxygen enriching apparatus of the present invention will be licensed by the applicant Life International, under their Model No. HO2LI-101.

As explained above, an inverse relationship can be established for the temperature of the water to be saturated with oxygen, and the pressure of the oxygen. Thus, for example, if the liquid is chilled to between about 8° C. and about 12° C. the oxygen pressure in the vessel is suitably between about 35 psi and about 55 psi. Depending on the room temperature, at about 17° C. to about 18° C. water temperature up to about 50 mg/l oxygen can be incorporated into the water, whereas if the ambient temperature is higher than that, the amount of oxygen that is dissolved in the water at the same $O_2$ pressure might be slightly lower. When the liquid is not water alone, but includes, for example, a suitable beverage concentrate, the oxygen absorbing capacity of the water becomes somewhat lower, such as from about 30 to about 35 mg/l.

Water from a central supply is normally available between about 10 and about 20 psi. In the apparatus of FIG. 1 the pressure of the water is suitably boosted by a water pump to about 70 psi to achieve good oxygen admixing through the venturi. At the output of the reduction valve the oxygen pressure is suitably around 45 psi and the pressure within the tank is a composite of about 50 psi generated by the composite of the 70 psi water and the 45 psi oxygen.

The apparatus of FIG. 1 can also be used for the preparation in several stages of a nonalcoholic beverage enriched with oxygen. Suitably a beverage concentrate, such as a syrup is mixed with an oxygen enriched water to contain about 5% to about 15% wt. solids. The oxygen enrichment of the pre-mix syrup concentrate can be achieved in the apparatus of FIG. 1, or a simpler apparatus, such as is shown in FIG. 2 can be employed.

Figure 2:
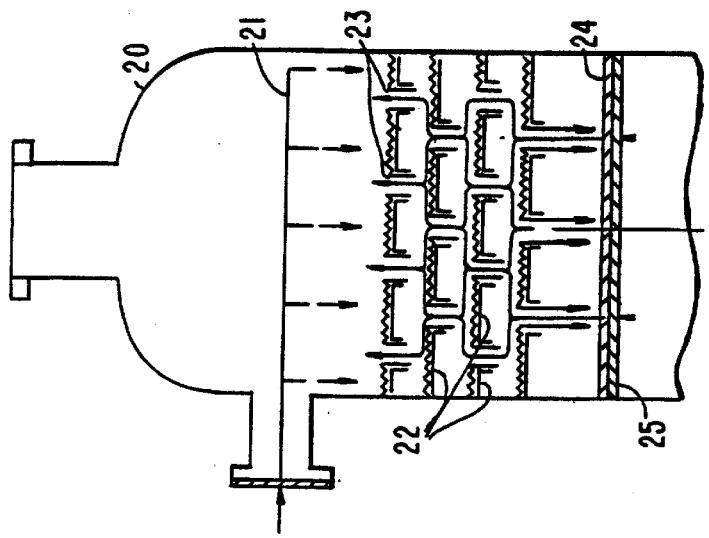
FIG. 2 is a longitudinal cross-sectional view of another oxygen enriching apparatus.

The apparatus of FIG. 2 includes a cylindrical container 20 and a liquid supply tube 21 extending horizontally through the upper part of the container 20, where the water inflow is subdivided into a number of smaller streams.

A plurality of horizontal guiding plates 22 is arranged in the interior of the cylindrical container 20. Each plate 22 has one or more orifices or downward projecting studs 23. These orifices are suitably arranged in concentric circles in the plates or trays. In the drawing an arrangement of the orifices is shown wherein they are offset between adjacent plates, and the alternate plates are shown with identical orifice layouts. A porous disk 24 is disposed below the lowermost guiding plate 22 and the gas inlet tube 25 is located below the disk 24. The disk 24 does not extend throughout the entire interior of the cylindrical container 20, so that the oxygen enriched water flowing from above can collect in the bottom of the container 20 (not shown).

The apparatus shown in FIG. 1 can also be used for the oxygen enrichment of wastewater. Suitably the wastewater to be so treated is screened prior to the introduction into the apparatus to remove larger solid waste particles from it. In an embodiment of the apparatus according to the present invention for such treatment of wastewater does not require a pressurized oxygenated water collector at the bottom of the vessel, because the oxygen enriched wastewater can be led away under ambient pressure.

Water to be enriched in the pre-enriching apparatus of FIG. 2, is introduced into the enriching container 25 through liquid supply tube 21 suitably at not more than twice the atmospheric pressure. The liquid flows downward from the supply tube 21 and through the orifices 23 in the guiding plates 22, in countercurrent with the oxygen introduced through the gas inlet tube 25 passing upwardly in the container 20. The porous disk 24 merely serves for a substantially uniform distribution of the gas input throughout the interior of the container. A sufficiently intensive contact is established between the downward flowing liquid and the rising gas, for the absorption of the latter through the large phase boundary. Oxygen concentrations of typically from about 10 to about 20 mg/l can be obtained in the pre-enricher device of FIG. 2.

Figure 3:
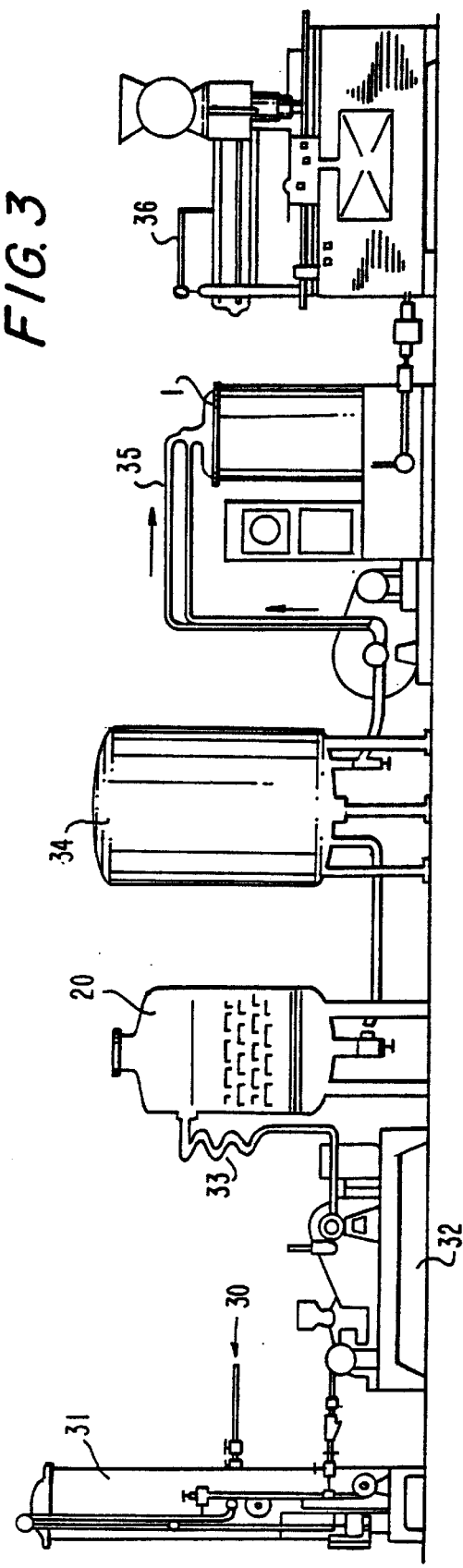
FIG. 3 is a schematic arrangement of a production line for enriching a liquid with oxygen.

In the manufacturing system shown in FIG. 3 the starting water is fed to a water inlet 30 after optional purification and filtration. Suitably the water is also disinfected, such as by an ozonizer. Air is removed from the water in a deaeration apparatus 31 for removing dissolved gases, mainly nitrogen. The deaerated liquid is passed through a supply pump 32 to an optional cooler 33 which suitably chills the water to a temperature of from about 8° to about 12° C.

The water passes from the cooler to the first stage oxygen enriching device 20 shown in greater detail in FIG. 2. The liquid oxygenated in the container 20 is passed to a storage container 34 where the preliminary oxygenated liquid is stored under oxygen pressure. When the system shown in FIG. 3 is used to prepare a flavored beverage, the storage container is loaded with a beverage syrup concentrate having a solids content of about 11% wt. and the oxygen enriched liquid from the enriching container 20 is introduced into the syrup in the container 34. The oxygenated liquid is fed from the storage container 34 to a final oxygen enriching apparatus 35 which is suitably of the type shown in greater detail in FIG. 1. After leaving the oxygen enrichment stage 35, the liquid is either stored under oxygen pressure or forwarded to bottling plant 36.

If the water is not to be mixed with a syrup-based concentrate, then the pre-oxygenating container 20 and the storage container 34 can be omitted and the starting water can be fed, optionally through the cooler 33, directly into the final oxygen enriching apparatus 35.

Figure 4:
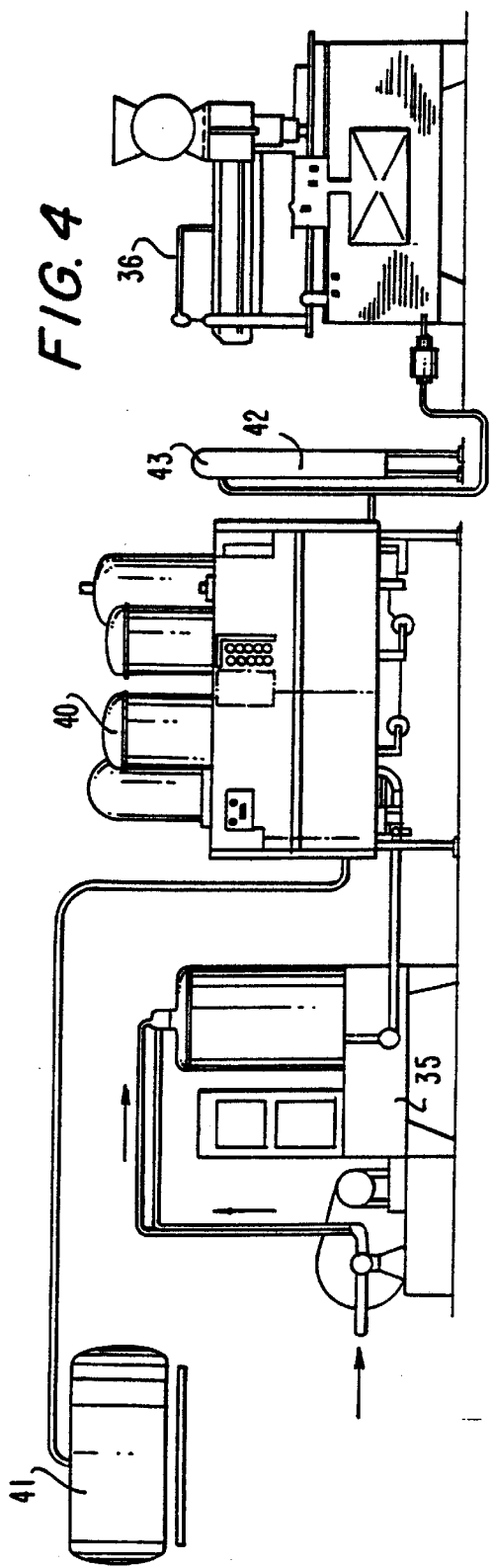
FIG. 4 is a similar production line, further illustrating enriching by carbon dioxide.

FIG. 4 shows a production line for an effervescent, oxygen enriched beverage. The liquid input into the apparatus at the left side of FIG. 4 is identical to the parts of the apparatus shown in FIG. 3 prior to the oxygen enriching apparatus 35. Accordingly, the liquid can be fed directly with or without prior chilling and with or without prior flavoring and pre-oxygenation at the arrow-indicated input of the system shown in FIG. 4.

The output of the oxygen enriching apparatus 35 shown in FIG. 4 is introduced in a $CO_2$ saturating device that is known per se. Such known apparatus usually includes a vacuum operated gas removing unit as a first stage which, however, is not necessary in the apparatus of the present invention since the already absorbed oxygen should not be removed by vacuum from the water, and because the absorbed gases from the initially input water were already removed as shown in FIG. 3. A $CO_2$ saturating apparatus 40 is connected to a $CO_2$ tank 41 and the output 42 of the apparatus 40 is introduced into an oxygenating saturator 43. The oxygen saturator 43 can be suitably be of the same design as the oxygen enriching apparatus shown in FIG. 1.

In the case of a beverage the effervescence-contributing carbon dioxide also has a disinfectant effect which permits the omission of any preservatives, and the absorbed $CO_2$ also contributes a preferred appearance and flavor of effervescence.

Figure 5:
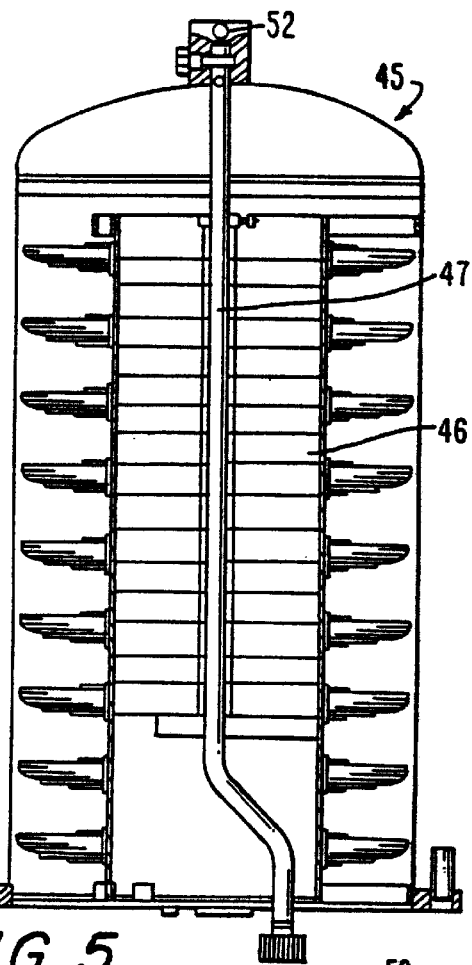
FIG. 5 is a cross sectional view of a different type of oxygen enrichment vessel of in accordance the present invention.

FIG. 5 shows an alternative embodiment of an oxygen enriching vessel 45 containing a plurality of trays 46 arranged around the concentrate gas/liquid supply tube 47.

FIG. 6 shows a mixing venturi having an oxygen input 49, a water input 49a, an output 50 for the subdivided water and oxygen mixture, and a separate oxygen outlet 51 for separate introduction of the gas into the top of the enriching vessel shown of 52.

It has been found that the oxygen retention is surprisingly good of liquids enriched by the process of the present invention by the use of the apparatus of the present invention. The oxygen decreases gradually at a relatively slow rate. When the oxygenated liquid is stored in a sealed bottle under an overpressure, the retention of the substantially high oxygen content of 50mg/l can be maintained over several years. When opened, the excess dissolved oxygen content is released over a period of about 24 hours and levels off at a concentration which is still considerably above the oxygen content of tap water. This means that when a beverage is consumed from a freshly opened full bottle, it will retain close to its initial oxygen content during its consumption from the open bottle at a convenient rate.

In other uses of the oxygen enriched water in accordance with the present invention the greatest usefulness of the enriched water is obtained in the case of those that involve sealed in aerobic processing containers which are capable of retaining the oxygen in the liquid for the longest appreciable periods. In accordance with the present invention it was discovered that otherwise conventional aerobic fermentation processes in closed vessels can be carried out advantageously with a fermentation liquor or broth comprised of a liquid oxygenated in accordance with the present invention. This invention has equal applicability to a large variety of fermentation processes, including, for example, fermentation of consumables and the manufacture of antibiotics and other substances produced in a liquid fermentation broth. According to another feature of the invention physiological saline solutions that are kept in closed containers, particularly for intravenous use where oxygenation is of primary importance, can be advantageously prepared in accordance with the oxygenation process of the present invention. Any required sterilization need to be made in any otherwise known manner other than by boiling of the oxygenated liquid. Alternatively, otherwise known sterile conditions can be employed in the oxygenation of a sterile saline solution. However, use can also be advantageously made of oxygen enriched liquids in accordance with the present invention in processes where sealed containers are not employed, because it is mostly the initial high oxygen content of the enriched liquid that is relied on for greatest initial activity, whereas the actual retention of the oxygen throughout extended periods is not of as great an importance.

We claim:

1. A process for enriching a liquid with oxygen which comprises the steps of
   (a) introducing a liquid and oxygen into a liquid and oxygen mixer and mixing the liquid with oxygen therein,
   (b) introducing the liquid from step (a) into a sealed enriching vessel containing a plurality of one of plates and trays, and flowing it gradually downwardly,
   (c) subjecting the interior of the vessel to an oxygen pressure of at least about 20 psi,
   (d) conducting the introduced liquid in a substantially flowing contact with the oxygen, whereby the liquid is enriched with oxygen, and
   (e) recovering all of the oxygen-enriched liquid.

2. The process of claim 1, wherein said recovering of the oxygen-enriched liquid is recovery under pressure.

3. The process of claim 1, wherein the liquid is subdivided at least in part by the oxygen prior to the introduction of the mixed liquid and oxygen into the sealed enriching vessel.

4. An aerobic process which comprises carrying out a chemical or microbiological reaction in an oxygen enriched liquid prepared by the process of claim 1 as the reaction medium.

5. A therapeutic process which comprises carrying out a therapeutic treatment of a body with an agent comprising an oxygen enriched liquid prepared by the process of claim 1 as a vehicle.

6. The process of claim 1, wherein the mixed liquid and oxygen introduced into the sealed enriching vessel is subdivided such that at least a portion of said mixed liquid and oxygen forms a boundary surface.

7. A fermentation process which comprises fermenting a fermentation liquor comprising the oxygen-enriched liquid prepared by the process of claim 1.

8. An apparatus for enriching a liquid with oxygen, which comprises
   (i) an oxygen enriching vessel having
      (a) an interior,
      (b) an interior surface,
      (c) a vertical axis,
      (d) a top, and
      (e) a bottom, (ii) a plurality of substantially horizontal annular trays within said enriching vessel in a vertically spaced relationship, each of said trays having
   (a) a substantially central opening, and
   (b) an outer rim spaced from said interior surface,
(iii) a liquid supply tube having an inlet and ranging into the interior of said enriching vessel through said openings,
(iv) discharge means in said liquid supply tube subdividing liquid entering from said supply tube into discrete water particles and from said supply tube onto a tray,
(v) an oxygen supply source in fluid communication with the interior for providing oxygen at a pressure of at least about 20 psi,
(vi) a liquid and oxygen mixer in fluid communication with said inlet of said liquid supply tube and with said oxygen supply source, and
(vii) a liquid outlet for the removal of oxygen-enriched liquid from said vessel.

9. The apparatus of claim 8, wherein each vertically downwardly succeeding tray has a larger circumference that any tray thereabove, said liquid supply tube terminates above the topmost of said trays, and said discharge means comprises a spray-forming member at the termination of said liquid supply tube.

10. The apparatus of claim 8, wherein one or more of said trays has one or more orifices therein to permit the passing of liquid therethrough to a vertically succeeding plate, and said liquid supply tube terminates above the topmost of said trays, and said discharge means comprises a spray-forming member at the termination of said liquid supply tube.

11. The apparatus of claim 10, wherein said orifices in vertically adjacent trays are arranged in radially offset positions relative to each other for spreading on a tray the liquid arriving from an orifice of an upper tray.

12. The apparatus of claim 8, wherein said oxygen supply source is adapted to inject the oxygen at the bottom of said enriching vessel through said liquid supply tube.

13. The apparatus of claim 8, further comprising means for introducing additional oxygen into the top of said enriching vessel.

14. The apparatus of claim 8, further comprising means for introducing additional oxygen into the bottom of said enriching vessel.

15. The apparatus of claim 8, wherein said oxygen supply source terminates in the interior of said vessel in a porous disk for evenly distributing oxygen flowing therethrough.

16. An aerobic process which comprises carrying out a chemical or microbiological reaction in an oxygen enriched liquid prepared with the apparatus of claim 8 as the reaction medium.

17. An therapeutic process which comprises carrying out a therapeutic treatment of a body with an agent comprising an oxygen enriched liquid as a vechicle, wherein said oxygen is in solution in said liquid, and said oxygen enriched liquid is prepared with the apparatus of claim 8.

18. The apparatus of claim 8 wherein said discharge means in said liquid supply tube for discharging liquid therefrom discharges liquid onto a plurality of trays.

19. A process for enriching a liquid with oxygen which comprises the steps of
   (a) introducing a liquid and oxygen into means for mixing said liquid with oxygen and mixing said liquid with oxygen therein,
   (b) introducing said liquid from step (a) into an oxygen enriching vessel having an interior, an interior surface, a vertical axis, a top, and a bottom, said vessel having disposed therein,
      (i) a plurality of substantially horizontal annular trays in a vertically spaced relationship, each of said trays having a substantially central opening, and an outer rim spaced from said interior surface of said oxygen enriching vessel, and
      (ii) a liquid supply tube having an inlet and liquid discharge means and ranging into said interior of said oxygen enriching vessel through said central openings,
   and flowing said liquid from said liquid discharge means gradually downwardly over at least one of said annular trays,
   (c) subjecting said interior of said oxygen enriching vessel to an oxygen pressure of at least 20 psi,
   (d) conducting said liquid in a substantially flowing contact with said oxygen, whereby said liquid is enriched with oxygen, and
   (e) recovering all of said oxygen-enriched liquid.

* * * * *

UNITED STATES PATENT AND TRADEMARK OFFICE
CERTIFICATE OF CORRECTION

PATENT NO. : 5,814,222

DATED : September 29, 1998

INVENTOR(S) : Zoltai Maria nae Zelenak et al

It is certified that error appears in the above-identified patent and that said Letters Patent is hereby corrected as shown below:

Claim 17, Col. 10, Line 10, delete "vechicle" and insert --vehicle--.

Signed and Sealed this

Second Day of February, 1999

Attest:

Attesting Officer

*Acting Commissioner of Patents and Trademarks*